(12) United States Patent
Holzmann, Jr.

(10) Patent No.: US 8,375,622 B1
(45) Date of Patent: Feb. 19, 2013

(54) STRAP ON FISHING ROD RACK

(76) Inventor: Dean James Holzmann, Jr., Glen Head, NY (US)

( * ) Notice: Subject to any disclaimer, the term of this patent is extended or adjusted under 35 U.S.C. 154(b) by 80 days.

(21) Appl. No.: 12/382,259

(22) Filed: Mar. 11, 2009

Related U.S. Application Data (60) Provisional application No. 61/064,621, filed on Mar. 14, 2008, provisional application No. 61/064,658, filed on Mar. 18, 2008, provisional application No. 61/064,656, filed on Mar. 18, 2008.

(51) Int. Cl.
*A01K 97/10* (2006.01)

(52) U.S. Cl. .......................... 43/21.2; 43/54.1

(58) Field of Classification Search ............ 43/21.1, 43/23, 54.1, 55, 56, 57.1, 21.2; 224/922; 248/230.8, 229.17, 512
See application file for complete search history.

(56) References Cited

U.S. PATENT DOCUMENTS

| | | | |
|---|---|---|---|
| 1,549,400 A * | 8/1925 | Wimler | 220/23.2 |
| 3,920,207 A * | 11/1975 | Adamaitis | 248/538 |
| 4,323,181 A * | 4/1982 | Spasoff | 224/674 |
| 4,852,291 A | 8/1989 | Mengo | |
| 4,871,099 A * | 10/1989 | Bogar, Jr. | 224/566 |
| 5,105,574 A * | 4/1992 | Fast | 43/21.2 |
| 5,373,802 A | 12/1994 | Krolick | |
| 5,557,877 A | 9/1996 | Colson | |
| 5,560,138 A | 10/1996 | Dentsbier | |
| 5,588,542 A | 12/1996 | Winkler, Jr. | |
| 5,715,952 A | 2/1998 | Chichetti | |
| 5,915,942 A | 6/1999 | Ratliffe | |
| 6,360,902 B1 | 3/2002 | Searles | |
| 6,533,132 B1 | 3/2003 | Weisenburger | |
| 6,926,240 B2 | 8/2005 | Goeller | |
| 7,165,703 B1 | 1/2007 | Howe | |
| 2007/0119093 A1* | 5/2007 | Jaskulski | 43/54.1 |

OTHER PUBLICATIONS

Author:Chris Woodward,Title of Article: "Rods at the Ready" p. 87 Sport Fish magazine, Oct. 2008, Florida, United States.
Author: Elizabeth Ellis, Title: "Couple Finds New Way to Add Rod Holders" p. 22 Soundings magazine,Oct. 2008, Connecticut,United States.
Author: James Bernstein, Title of Article: "His Rack is a Fishing Lure" p. A31 Newsday Feb. 9, 2009, New York,United States.
Author:Fred Golofaro,Title of Article:"Holzster Strap-On Rod Rack" The Fisherman Jan. 15, 2009 p. 22, New York, United States.
Author:Tom Richardson, Title of Article: "Hold It" p. 29 Northeast Boating, Dec. 2008 Massachusetts, United States.
Author: William Sherman, Title: "New Products Holzster Strap on Fishing Rod Rack", Boating World Dec. 2008 New York, United States.

* cited by examiner

*Primary Examiner* — David Parsley (57) ABSTRACT

A strap on fishing rod rack comprising of fixed horizontal panels, tubular housing, straps and a fastening device. The rack straps around an ice cooler or other object and hold a plurality of fishing rods in an upright position. The device is removable and can be affixed without the need for screws or drilling making it useful for mounting to coolers and other fixtures that are unsuitable for other mounting applications. The rack includes horizontal panels on which vertical fishing rod support tubes are affixed. Individual horizontal panels may consist of two members, each with a channel and groove extending the length of the member. The members may be joined creating a channel along the inside of each horizontal panel. The rack includes straps. A strap slides inside the horizontal panel, in one end, and exits out the other. A stainless steel ratchet buckle is affixed on one end of each strap providing a simple but secure method to firmly attach the apparatus to the fixture.

1 Claim, 9 Drawing Sheets

STRAP ON FISHING ROD RACK

CROSS-REFERENCE TO RELATED APPLICATIONS

This non-provisional utility patent application is claiming the benefit of three provisional applications to with:
1. Strap On Fishing Rod Rack
   Application No. 61/064,621
   Filing date: Mar. 14, 2008
2. Strap On Metal Fishing Rod Rack
   Application No. 61/064,658
   Filing date: Mar. 18, 2008
3. Strap On Fishing Rod Rack With End Mounts.
   Application No. 61/064, 656
   Filing date: Mar. 18, 2008

STATEMENT REGARDING FEDERALLY SPONSORED RESEARCH OR DEVELOPMENT

The application claims no rights or obligations under any federal research or development program.

REFERENCE TO SEQUENCE LISTING, TABLE OR A COMPUTER PROGRAM LISTING COMPACT DISC APPENDIX

None.

BACKGROUND OF THE INVENTION

1. Field of the Invention

The present invention relates to a fishing rod rack that may be strapped to an ice cooler or other object comprising of fixed horizontal panels, straps and ratchet buckles.

Application fields of invention under U.S. Patent classification definitions include:
43/21.2;
108/151; 108/152;
211/60.1; 211/70.8;
248/346.03; 248/354.7; 248/512

2. Prior Art

Prior art has produced various rack systems to hold fishing rods on a vessel when not in use. These systems have all used various methods to affix the rack including the use of drills and screws. Other fishing rod racks use suction to secure the rack, but that requires a smooth non-porous mounting surface. Prior Art has also produced multi function devices for hands free fishing that strap to piers and other vertical structures. This prior art includes workstations or cutting boards that strap to cylindrical surfaces wherein individual tubes attach directly to the straps.

The prior art does not provide for a fishing rod rack that can be strapped to an ice cooler or similar object to hold rods when not in use. Quick and easy access to finishing rods on a vessel is an important part of a successful day on the water. Located in the cockpit of most fishing boats sits a cooler used to store food, beverages and other items to be kept on ice. Being in close proximity to the fishing action it is in a prime location for a fishing rod rack. Drilling into a cooler to mount such a rack is not an option for obvious reasons. The invention is a fishing rod rack which mounts securely to a cooler or other fixture utilizing a strap and ratchet buckle method. This system eliminates the need to drill into a cooler or other fixture and can be mounted on porous, rough or uneven surfaces, and provides the angler with an easy method to affix and remove the rack as needed. It is an advantage of this present invention that the rack have rigid horizontal panels which allows for each rod holder to be firmly and permanently affixed to the horizontal panels to form one rack.

An embodiment of the present invention provides for the horizontal panels to have a center channel down the middle of each panel which allows the straps to slide down the length of each panel with a ratchet buckle or similar device affixing the invention to the ice cooler or similar object making it easy to install and remove as needed. The horizontal panels, in the alternative, may contain a ring and bracket at each end to affix the straps to the horizontal panels.

By way of example, U.S. Pat. No. 5,557,877 to Colson discloses a universal mount fishing rod holder. U.S. Pat. No. 5,715,952 to Chichetti discloses a portable and removable fishing rod holding device. U.S. Pat. No. 4,852,291 to Mengo discloses a fishing rod holder mount kit. U.S. Pat. No. 5,560,138 to Dentslien discloses a fishing rod holder. U.S. Pat. No. 6,360,902 to Searles discloses a fishing rod rack for boat decks. U.S. Pat. No. 6,926,240 to Goeller discloses a strap-on multi-function apparatus with integral supports and work surface for use during fishing, boating camping, etc. U.S. Pat. No. 7,165,703 to Howe discloses an elongated implement holder especially for use on boats. U.S. Pat. No. 5,588,542 to Wrinkler discloses a fishing rod rack. U.S. Pat. No. 6,533,132 to Weinberger discloses a portable fishing rod rack. U.S. Pat. No. 5,915,942 to Ratliffe discloses a multi-functional fishing rod holder. U.S. Pat. No. 5,373,802 to Krolich discloses an attachment method and apparatus.

SUMMARY OF INVENTION

The shortcoming of the prior art are overcome by the present strap on fishing rod rack, which allows for an ice cooler located in the cockpit of your boat to serve as a source for fishing rods. The rack mounts securely without the need to drill or screw into the cooler or other object. The invention includes vertical fishing rod support tubes that are affixed to one or more fixed horizontal panels. These horizontal panels may each contain a channel down the middle extending the length of the rack. The horizontal panels may consist of two members each with a groove on one side that when joined create a channel along the inside of the panel.

The invention also includes straps. The straps may slide down the middle of the horizontal panels with the strap entering the horizontal panel at one end and exiting out the other. A stainless steel ratchet buckle or similar device is affixed on one end of the strap providing a secure method to affix the rack to the fixture.

In a further embodiment of the invention, and as an option to the internal channel, a bracket and ring may be affixed to each end of the horizontal panel to which the straps attach.

BRIEF DESCRIPTION OF SEVERAL VIEWS OF THE ILLUSTRATION

The objects, features and advantages of the present invention will be more readily appreciated as the same becomes better understood from the following detailed description when considered in connection with the accompanying drawings, wherein.

DETAILED DESCRIPTION OF THE INVENTION

Figure 1:
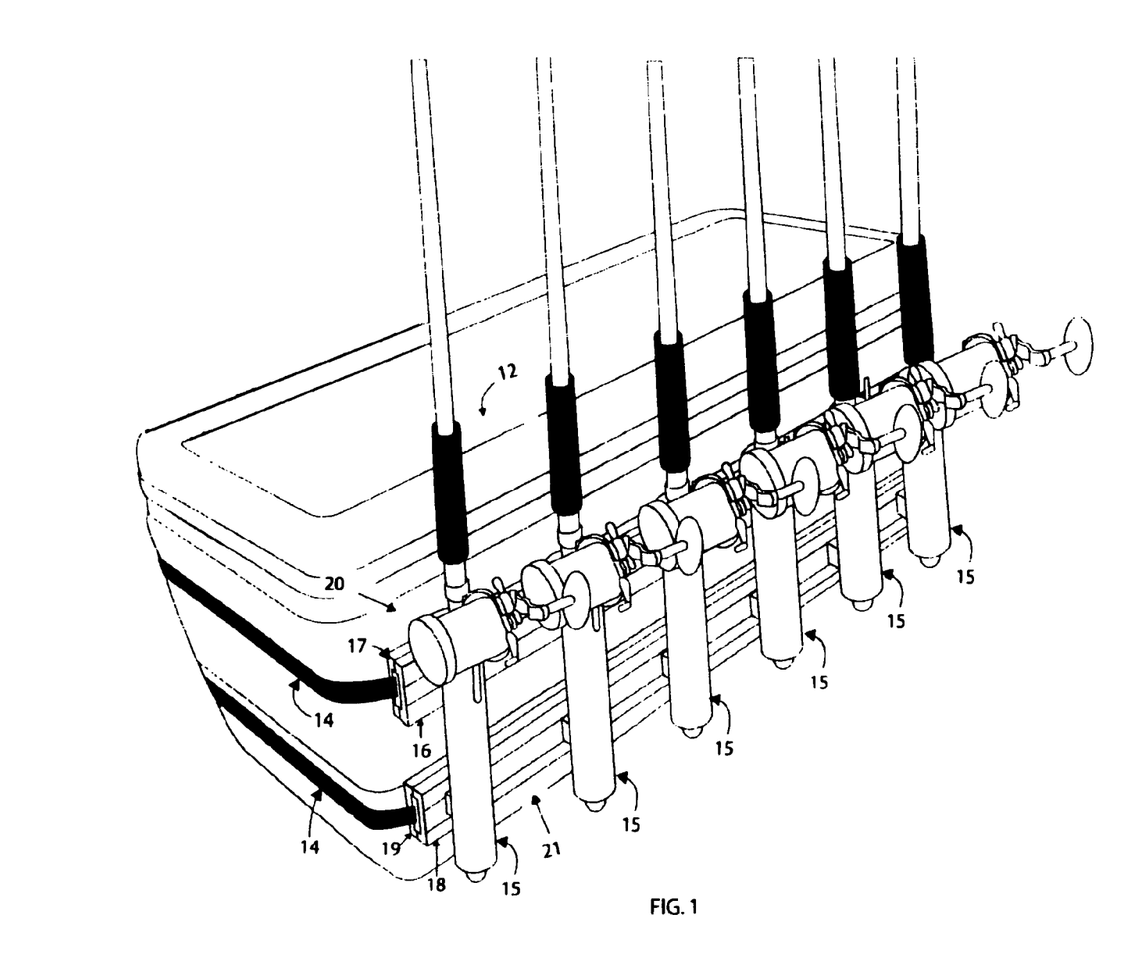
FIG. 1 is the fishing rod rack shown with the horizontal panels fabricated from two members, attached to a cooler with fishing rods.

Referring now to the drawings, in FIG. 1, there is shown a strap on fishing rod rack 12 embodying the present invention on a cooler with fishing rods. As hereinafter described, the strap on fishing rod rack 12 is mountable without the need for screws or brackets and can be affixed to uneven, rough or porous surfaces. The invention may be removed from the fixture when not in use.

Figure 2:
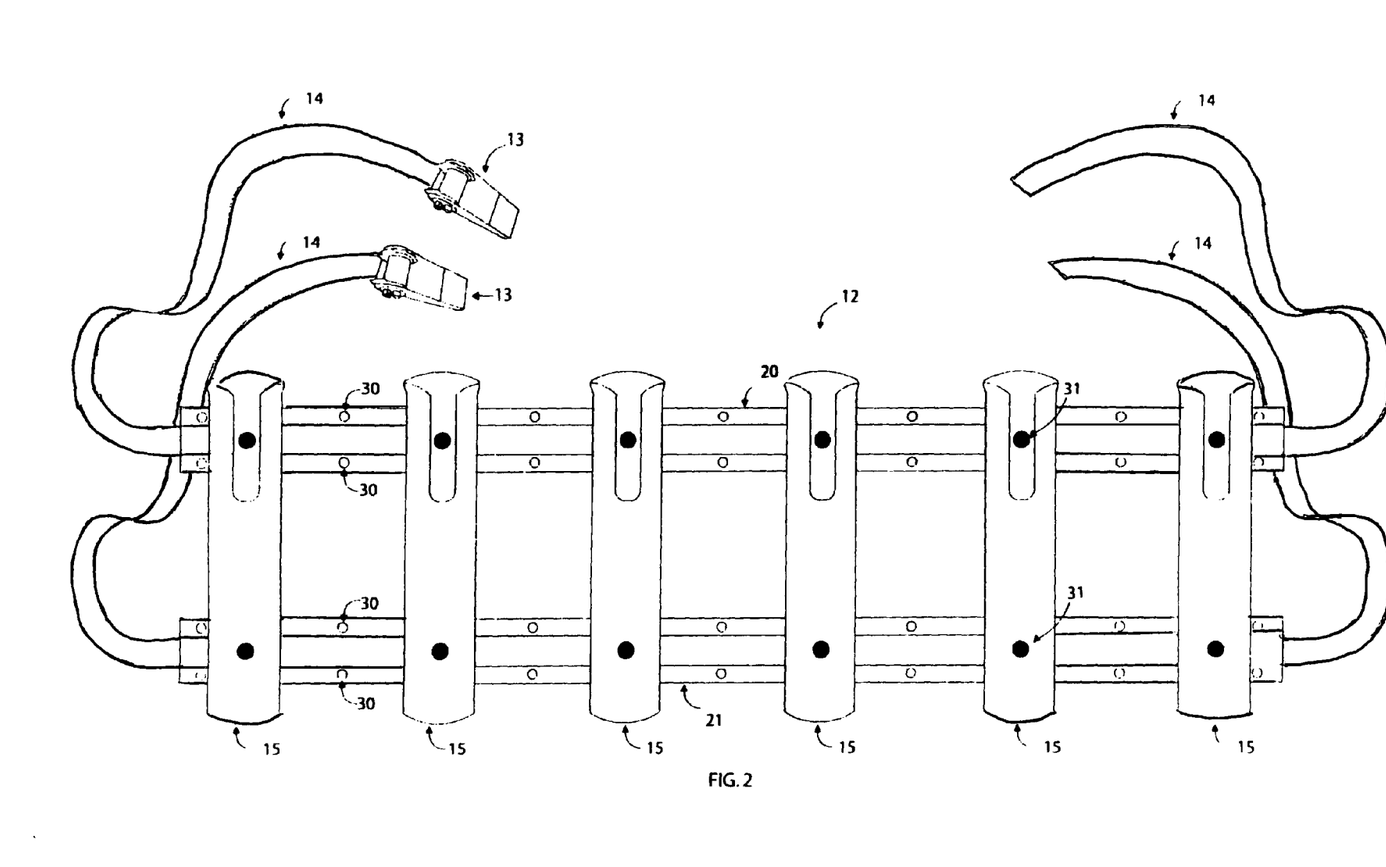
FIG. 2 is a frontal view of the fishing rod rack shown with the horizontal panels fabricated from two members, in an unattached position with straps and ratchet buckles.

The strap on fishing rod rack 12 in an unattached condition is shown in FIG. 2.

Figure 3:
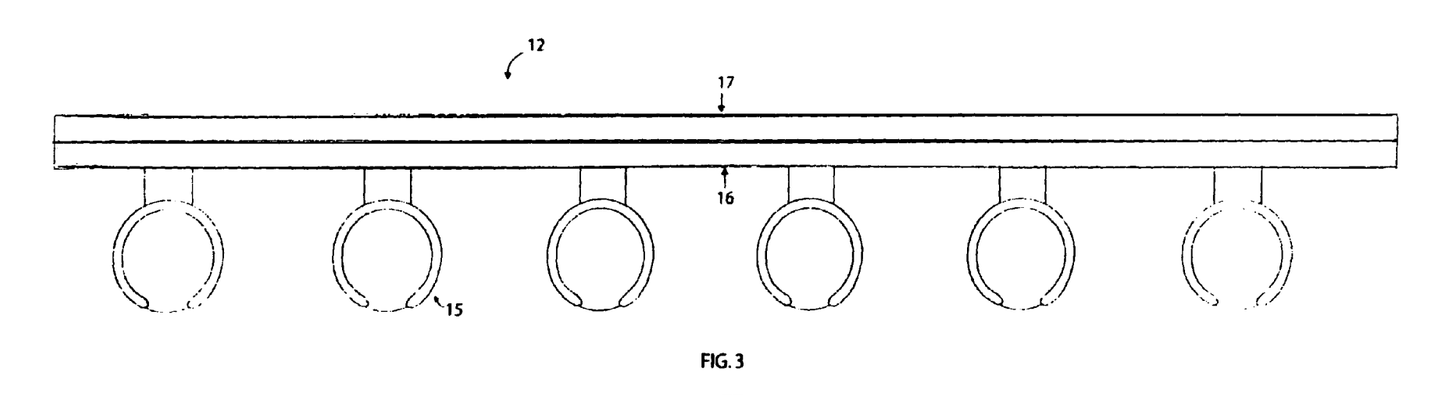
FIG. 3 is a top view of the fishing rod rack shown with the horizontal panels fabricated from two members.

The strap on fishing rod rack 12 in a top view, with straps removed for better illustration, is shown in FIG. 3.

Figure 4:
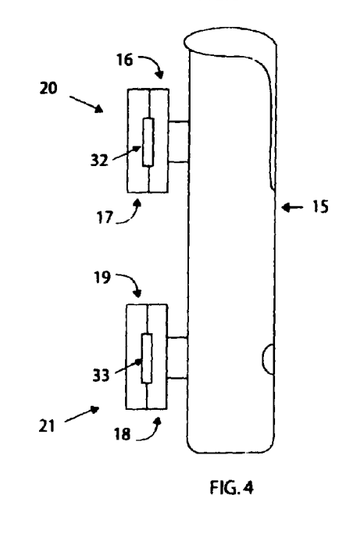
FIG. 4 is a side view of the fishing rod rack shown with the horizontal panels formed from two members, with the strap removed for illustration.

The strap on fishing rod rack 12 in the side view shown, with straps removed for better illustration, is shown in FIG. 4

The strap on fishing rod rack as embodied in FIG. 1 includes:

Referring now to FIG. 4, two horizontal panels 20 and 21 on which the fishing rod holders 15 are affixed. For example, the upper horizontal panel 20 affixes the upper part of each rod holder 15 and the lower horizontal panel 21 affixes the lower part of each rod holder 15.

In FIG. 4 the upper horizontal panel 20 consists of a top member 16 and bottom member 17 attached to form one horizontal panel 20. The bottom member 17 and top member 16 contain a channel 32 which runs along the length.

In FIG. 2 the members 16 & 17 which form the upper horizontal panel 20 are connected. For example, holes are drilled 30 through the top 16 and bottom 17 members along the outer edges. Stainless steel bolts 30 are passed through the top member 16 into the bottom member 17 where fastening nuts 30 hold the two members together. This forms the upper horizontal panel 20 through which a channel 32 now runs down the middle along its length.

In FIG. 2 a second set of holes 31 are screwed into the top member 16 along the center to affix each individual rod holder 15. For example, along the center of the groove which runs along the top member 16, holes are drilled 31. Individual rod holders 15 are mounted to the top member 16 on both the upper and lower horizontal panels.

In FIG. 4 the lower horizontal panel 21 also consists of a top member 18 and bottom member 19 bolted together to form one horizontal panel 21. For example, the bottom member 19 and top member 18 contain a channel 33 which runs along the length. This application creates a channel 33 inside and along the entire length of the horizontal panel 21.

In FIG. 2 the members 18 & 19 which form the lower horizontal panel 21 are connected. For example, holes are drilled 30 through the top 18 and bottom 19 members along the outer edges. Stainless steel bolts 30 are passed through the top member 18 into the bottom member 19 where fastening nuts 30 hold the two members together. This forms the lower horizontal panel 21 through which a channel 33 now runs down the middle along its length.

In FIG. 2 a second set of holes 31 are screwed into the top member 18 along the center to affix each individual rod holder 15. For example, along the center of the groove which runs along the top member 18, holes are drilled 31. Individual rod holders 15 are mounted to the top member 18 on the lower horizontal panel 21.

In FIG. 2 a stainless steel ratchet buckle 13 is attached to one end of a strap 14 for the upper horizontal panel. A stainless steel ratchet buckle 13 is sewn to one end of the strapping 14 using polymer threading, leaving the other end of the strap unmodified.

In FIG. 2 a second strap 14 is made and affixed to a stainless steel buckle as above for the lower horizontal panel.

In FIG. 1 a strap is threaded through the upper horizontal panel 20 sliding down the channel 32 the entire length of the horizontal panel entering at one end and exiting at the other.

In FIG. 1 the second strap is threaded through the lower horizontal panel 21. Sliding down the channel 33, the entire length of the horizontal panel 21 entering at one end and exiting at the other.

In FIG. 1 when the fishing rod rack 12 is installed, the bottom members 17 & 19 of both the upper horizontal panel 20 and lower horizontal panel 21 rest against the mountable fixture.

In FIG. 1 for example, the two horizontal panels 20 & 21 are placed against the cooler or other suitable fixture to be mounted. The horizontal panels 20 & 21 connect all individual rod holders 15 which may be perpendicular to the horizontal panels 20 & 21 and the ground.

In FIG. 2 the straps 14 which have each been threaded through the horizontal panel 20 & 21 are wrapped around the fixture where the open end of the strap 14 is threaded into the ratchet buckle 13. The ratchet buckle 13 is then tightened causing the strap to tighten securing the rack 12 firmly to the fixture.

Figure 5:
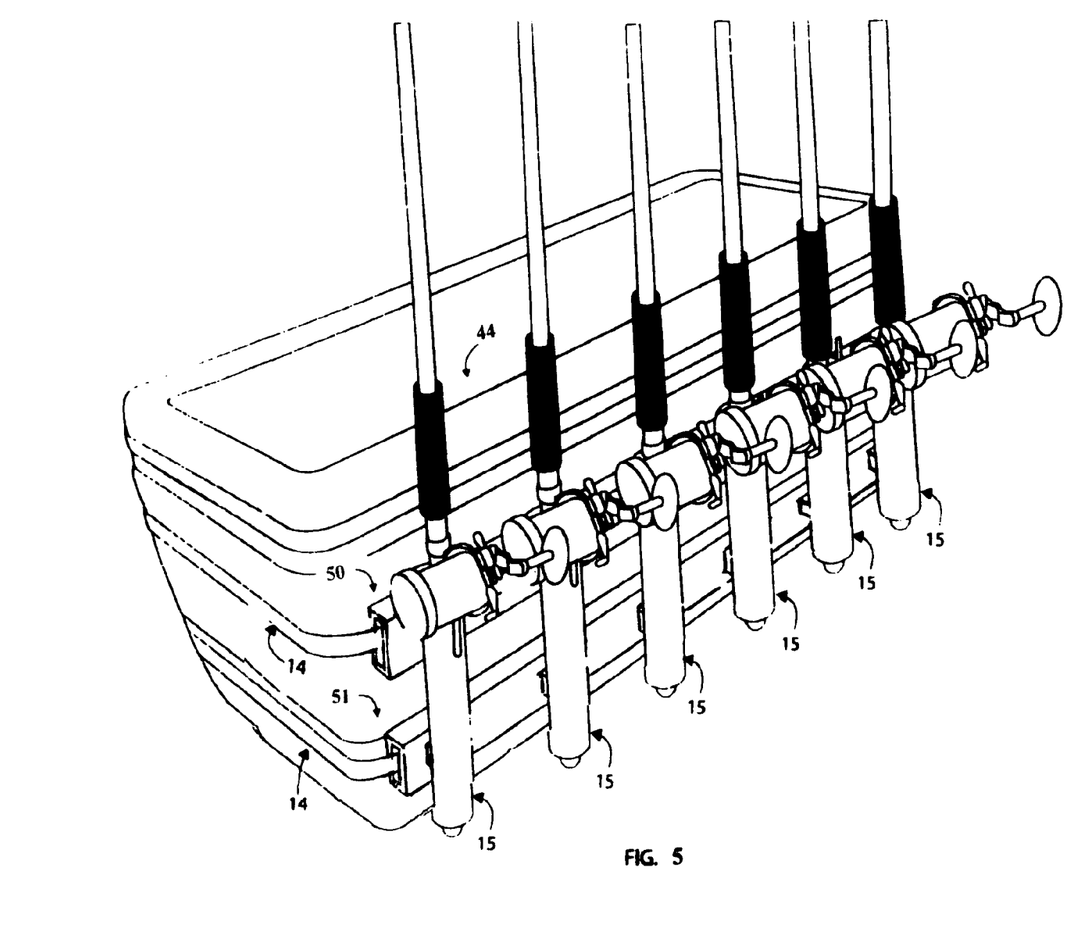
FIG. 5 is a perspective view of the fishing rod rack shown with the horizontal panel formed from one member and cannular, in an attached condition on a cooler with fishing rods.

Referring now to FIG. 5 there is shown the present invention on a cooler with fishing rods wherein the horizontal panels shown are one member and cannular providing for a channel down the inside of the panel. The panels may be comprised of metal tubing.

Figure 6:
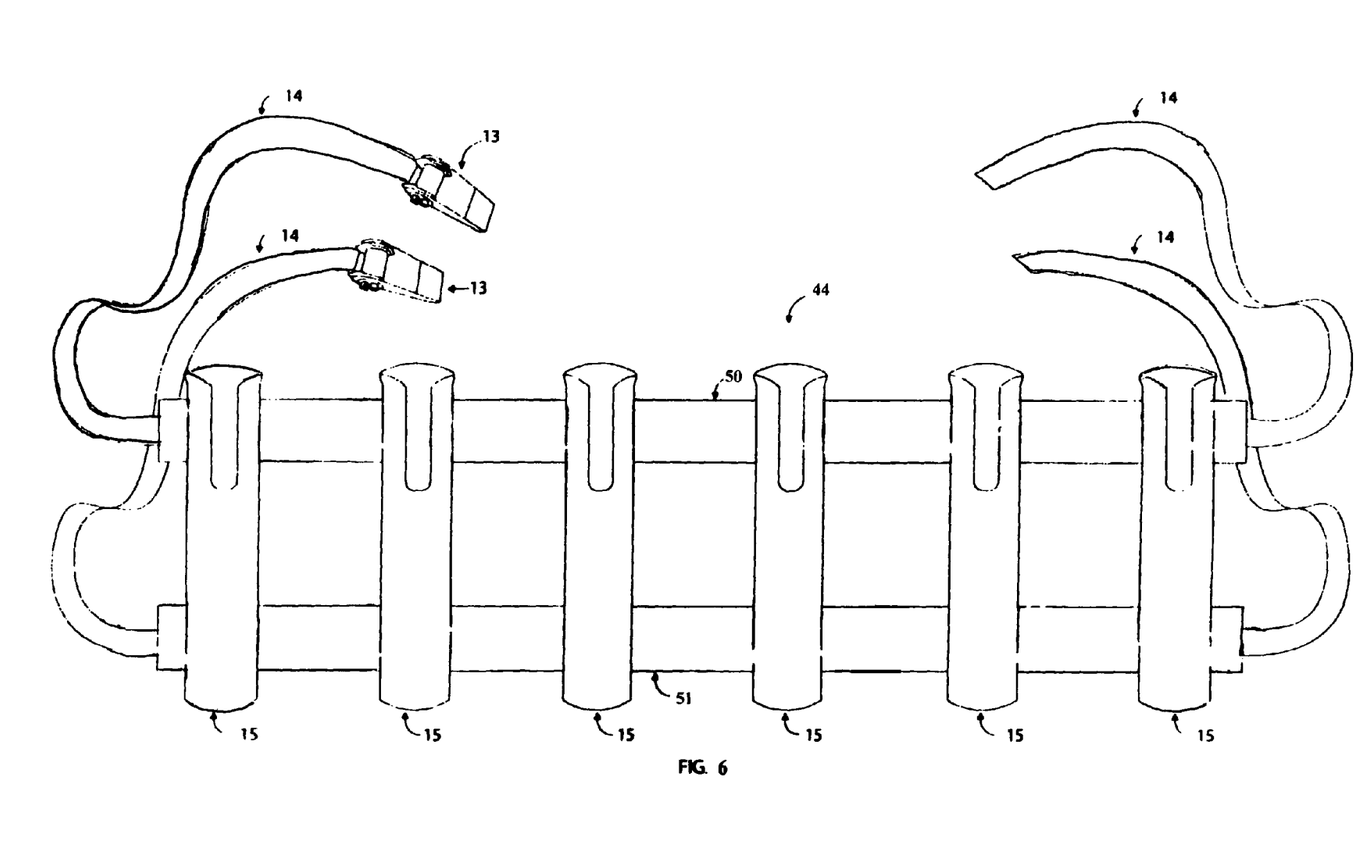
FIG. 6 is a frontal view of the fishing rod rack shown with the horizontal panel formed from one member and cannular, in an unattached position with straps and ratchet buckle.

The fishing rod rack 44 with one piece horizontal panels in an unattached position is shown in FIG. 6.

Figure 7:
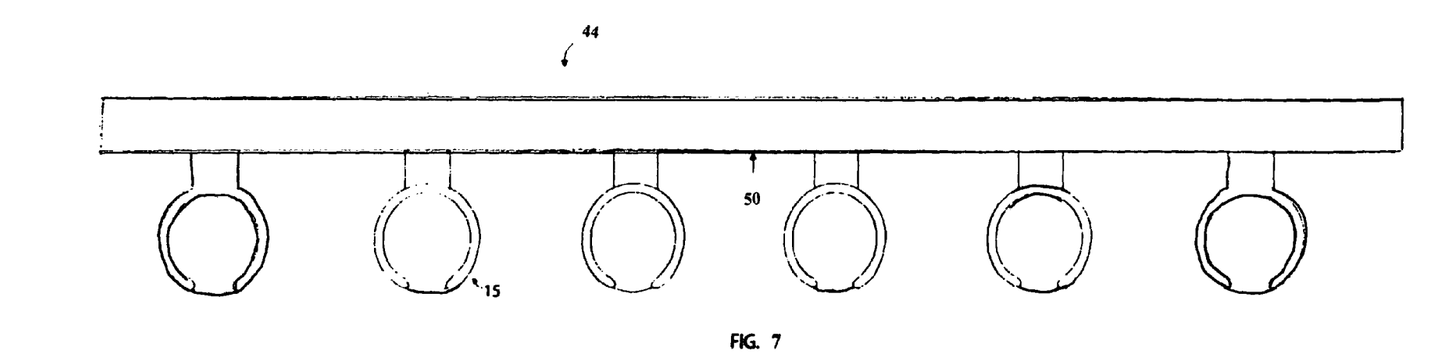
FIG. 7 is a top view of the fishing rod rack shown with the horizontal panel formed from one member and cannular.

The fishing rod rack 44 shown with one piece horizontal panels from top view FIG. 7.

Figure 8:
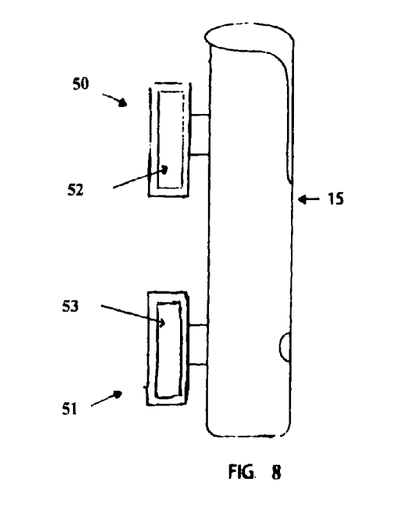
FIG. 8 is a side view of the unattached fishing rod rack shown with the horizontal panel formed from one member and cannular, with the strap removed for illustration.

The fishing rod rack 44 shown with one piece horizontal panel fabrication from side view FIG. 8.

Referring to FIG. 8, two horizontal panels 50 and 51 on which the fishing rod holders 15 are affixed. For example, the upper horizontal one piece tubular panel 50 affixes the upper part of each rod holder 15 and the lower horizontal panel 51 affixes the lower part of each rod holder 15.

Referring to FIG. 8, this embodiment provides a channel 52 & 53 inside and along the entire length of both horizontal panels 50 & 51 through which the strap 14 is threaded.

Referring to FIG. 8, individual rod holders 15 are affixed to the upper and lower horizontal panels 50 & 51.

Referring to FIG. 6, a stainless steel ratchet buckle 13 is connected on one side of a strap 14. For example, a stainless steel buckle 13 is sewn to one end of the strapping 14 using polymer threading, leaving the other end of the strap unmodified.

Referring to FIG. 6, a second strap 14 is made and affixes to a stainless steel buckle as above for the lower horizontal panel.

Referring to FIG. 6, one strap is threaded through the upper horizontal panel 50 sliding down the channel 52 the entire length of the horizontal panel entering at one end and exiting at the other.

Referring to FIG. 6, the second strap is threaded through the lower horizontal panel 18. Sliding down the channel 53, the entire length of the panel 51 entering at one end and exiting at the other.

Referring to FIG. 5, when the fishing rod rack 13 is installed, the horizontal panels 50 & 51 rest against the mountable fixture.

Referring to FIG. 5, for example, the two horizontal panels 50 & 51 are placed against the cooler or other suitable fixture to be mounted. The horizontal tubes 50 & 51 connect all individual rod holders 15 which may be perpendicular to the horizontal panels 50 & 51 and the ground.

Referring to FIG. 5, the straps 14 which have been threaded through the horizontal panel 50 & 51 are wrapped around the fixture where the open end of the strap 14 is threaded into the ratchet buckle 13. The ratchet buckle 13 is then tightened causing the strap to tighten securing the rack 44 firmly to the fixture.

Figure 9:
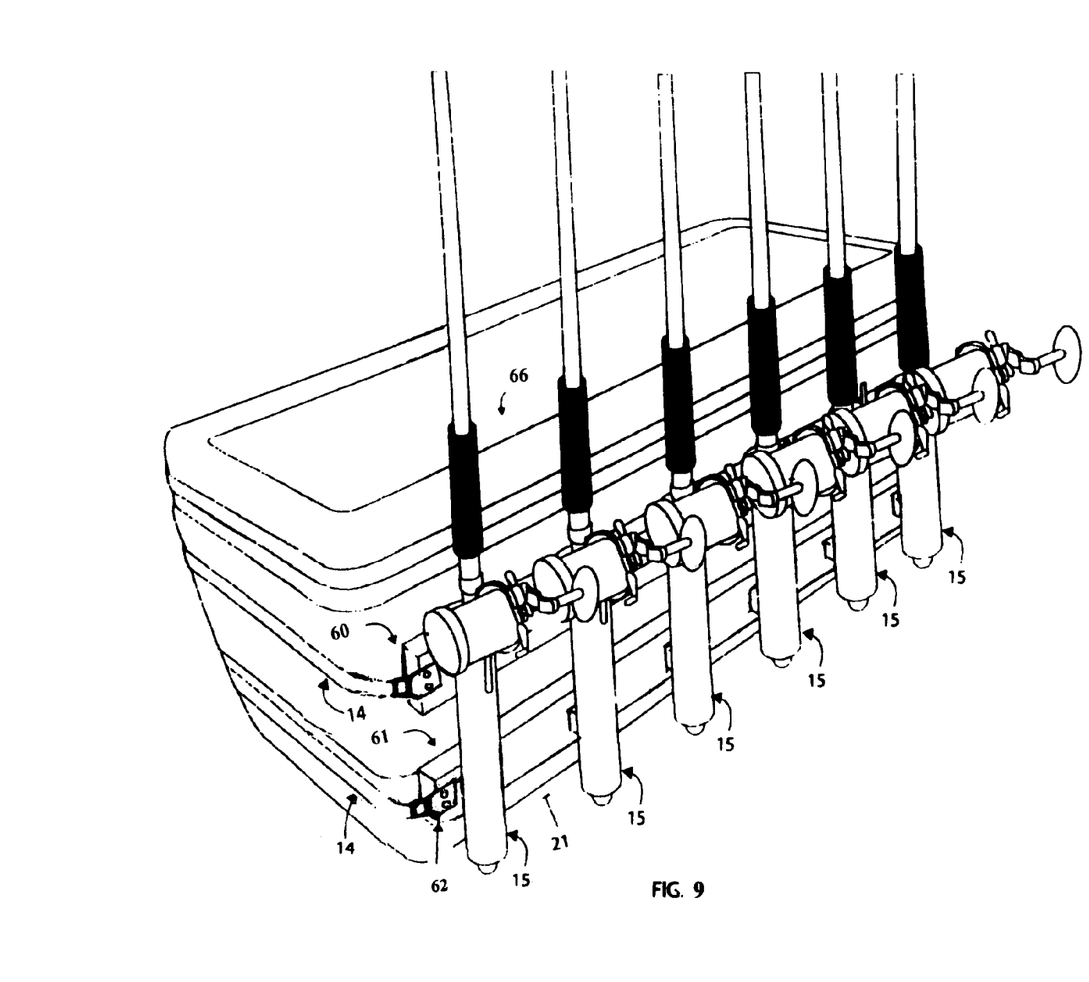
FIG. 9 is a perspective view of the fishing rod rack shown with the horizontal panel formed from one member with a ring and bracket attached to each end of the panel with the straps affixed, attached to a cooler with fishing rods.

Referring now to FIG. 9 there is shown the present invention on a cooler with fishing rods wherein the horizontal panels 60 & 61 are fabricated with a ring and bracket 62 to enable the straps to be affixed to the ends of the horizontal panels.

Figure 10:
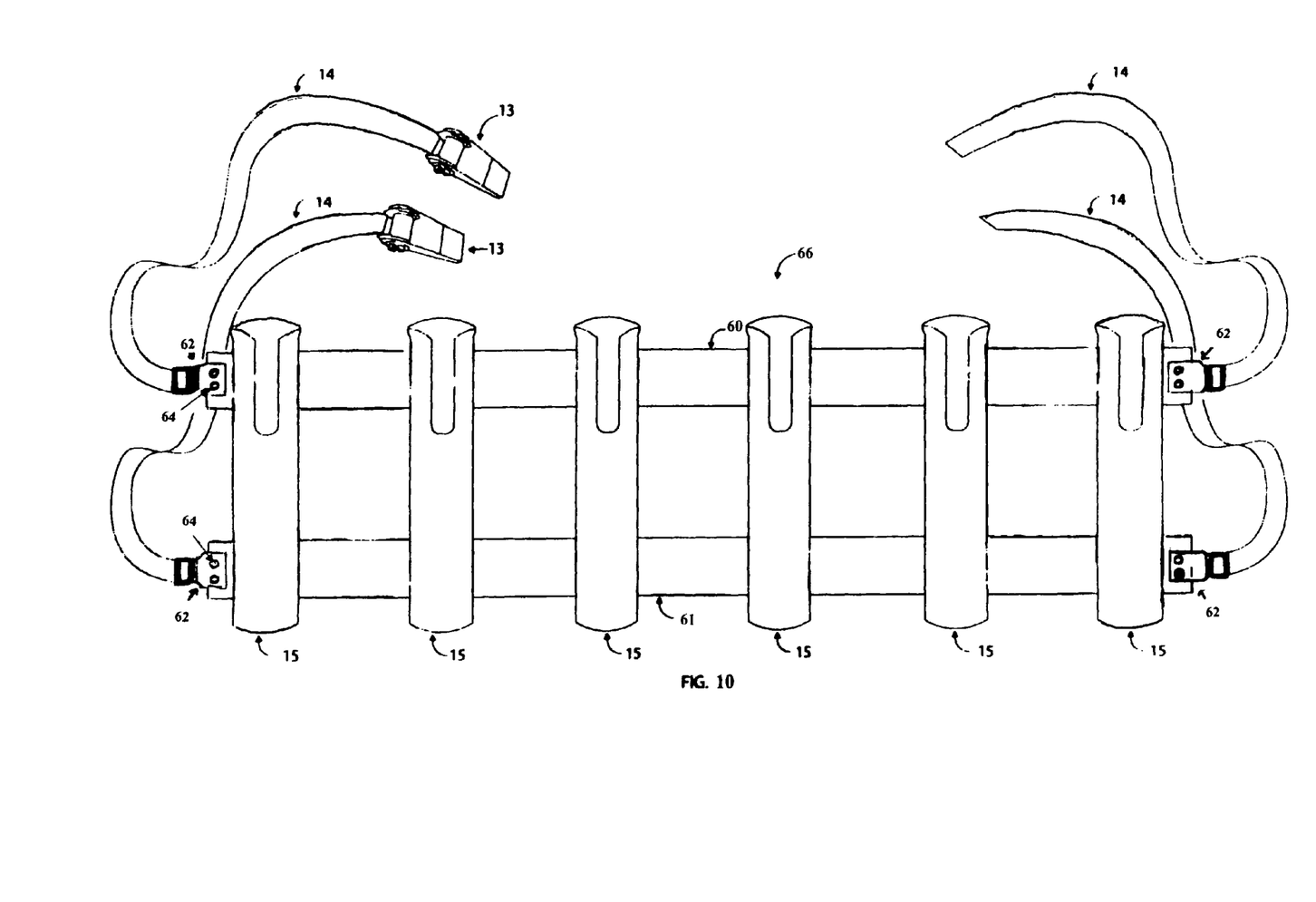
FIG. 10 is a frontal view of the fishing rod rack shown with the horizontal panel formed from one member with a ring and bracket attached to each end of the panel with the straps affixed, in an unattached position with straps and ratchet buckle.

The fishing rod rack 66 in an unattached condition embodied with straps 14 secured by a ring and bracket 62 and ratchet buckle 13 is shown in FIG. 10.

Figure 11:
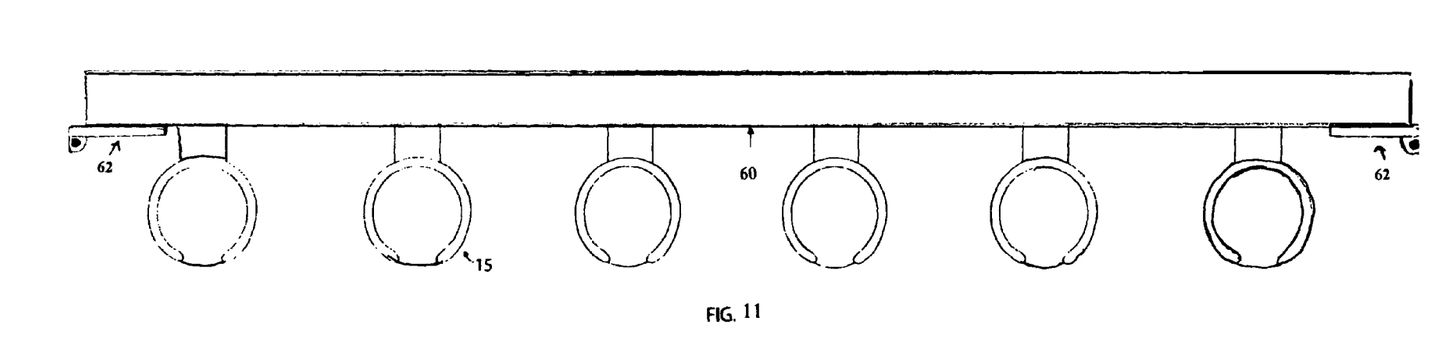
FIG. 11 is a top view of the fishing rod rack shown with the horizontal panel formed from one member with a ring and bracket attached to each end of the panel. (Straps are removed for illustration purposes)

The fishing rod rack 66 in a top view with straps removed for illustration purposes in FIG. 11.

Figure 12:
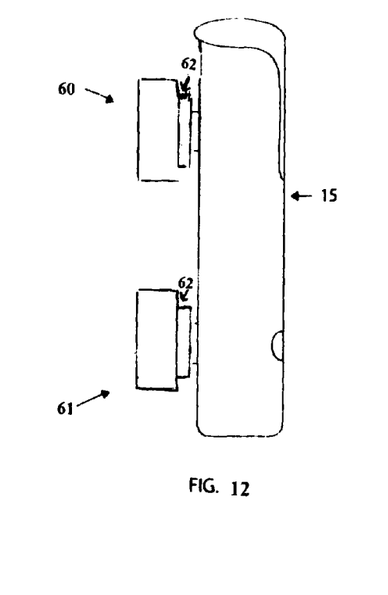
FIG. 12 is a side view of the unattached fishing rod rack shown with the horizontal panel formed from one member with a ring and bracket attached to each end of the panel. (Straps are removed for illustration purposes).

The fishing rod rack 66 in side view with straps removed for illustration purposes in FIG. 12.

The fishing rod rack 66 includes:

Referring now to FIG. 12, two horizontal panels 60 & 61 on which the fishing rod holders 15 are affixed. For example, the upper horizontal panel 60 affixes the upper part of each rod holder 15 and the lower horizontal panel 61 affixes the lower part of each rod holder 15.

In FIG. 10 the upper horizontal panel 60 includes a ring and bracket 62 on each end which joins a strap 14 sewn to the ring. The ring and bracket 62 are attached to each end of the horizontal panels using a nut and bolt.

In FIG. 10 the lower horizontal panel 61 includes a ring and bracket 62 on each end which joins a strap 14 sewn to the ring.

In FIG. 10 the embodiment further shows that for each horizontal panel 60 & 61 a stainless steel ratchet buckle 13 is sewn to one strap 14 at the end. For example, a stainless steel buckle 13 is sewn to one end of the strap 14 using polymer threading. The strap on the other end of each horizontal panel 60 & 61 is unmodified.

In FIG. 9 when the fishing rod rack 66 is installed, the horizontal panels 60 & 61 rest against the mountable fixture.

In FIG. 9 for example, the two horizontal panels 60 & 61 are placed against the cooler or other suitable fixture to be mounted. The horizontal panels 60 & 61 connect all individual rod holders 15 which may be perpendicular to the horizontal panels 60 & 61 and the ground.

In FIG. 9 the straps 14 which have each been attached to the ring and bracket at each end of the horizontal panels 60 & 61 are wrapped around the fixture where the open end of the strap 14 is threaded into the ratchet buckle 13. The ratchet buckle 13 is then tightened causing the strap to contract securing the rack 66 firmly to the fixture.

I claim:

1. A strap on fishing rod rack comprising;
two horizontal panels, wherein each horizontal panel is elongated in a horizontal direction defined by the longitudinal axis of each panel, each panel extending along at least one entire side of a mounting object having a plurality of sides, each panel having a first and second end defining the ends of the longitudinal length of each panel and an interior channel extending the entire longitudinal length of each panel,
a plurality of tubular housings configured for receiving fishing rods, each tubular housing affixed to each horizontal panel, wherein metal hardware affixes each of the plurality of tubular housings to each of the horizontal panels,
two straps, with one each of said straps extending through each channel of the two panels and extending along the length of each panel with each strap entering at the first end of each panel and exiting at the second end of each panel, each strap extending around all of the sides and the entire mounting object,
a plurality of ratchet buckles with at least one ratchet buckle sewn to one end of each strap configured to secure each of the straps, the panels and the tubular housings to the mounting object.

* * * * *